(12) United States Patent
Seol

(10) Patent No.: US 7,380,141 B2
(45) Date of Patent: May 27, 2008

(54) TRANSFERRING DATA WITHOUT COMPLETING A BOOT PROCESS

(75) Inventor: Seong-hwan Seol, Incheon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 434 days.

(21) Appl. No.: 10/963,656

(22) Filed: Oct. 14, 2004

(65) Prior Publication Data
US 2005/0108583 A1    May 19, 2005

(30) Foreign Application Priority Data
Nov. 19, 2003  (KR) ...................... 10-2003-0082071

(51) Int. Cl.
*G06F 1/00* (2006.01)
(52) U.S. Cl. .......................... 713/300; 710/14; 710/65
(58) Field of Classification Search ................ 713/300; 710/65, 14
See application file for complete search history.

(56) References Cited

U.S. PATENT DOCUMENTS

| 5,414,860 | A | 5/1995 | Canova, Jr. |
| 6,604,157 | B1 * | 8/2003 | Brusky et al. ................ 710/65 |
| 6,839,836 | B2 * | 1/2005 | Cole et al. ...................... 713/2 |
| 6,904,535 | B2 * | 6/2005 | Yamada et al. ............. 713/324 |
| 2002/0023182 | A1 * | 2/2002 | Jacobs et al. ................ 710/14 |
| 2002/0152408 | A1 * | 10/2002 | Inui et al. .................... 713/300 |

FOREIGN PATENT DOCUMENTS

| CN | 1063766 A | 8/1992 |
| JP | 8-129617 | 5/1996 |
| KR | 98-4076 | 3/1998 |
| KR | 1998-50678 | 9/1998 |
| KR | 20-172588 | 12/1999 |
| KR | 2001-44238 | 6/2001 |

OTHER PUBLICATIONS

Chinese Office Action for Application No. 200410085787.2; dated Mar. 31, 2006.

* cited by examiner

*Primary Examiner*—Thomas Lee
*Assistant Examiner*—Jaweed A Abbaszadeh
(74) *Attorney, Agent, or Firm*—Staas & Halsey LLP

(57) ABSTRACT

A computer system including a power supply; a connector to be connected with a detachable storage medium; an auxiliary memory; a selection input part to generate a storage function processing signal to store data of the storage medium to the auxiliary memory according to an operation of a user; a an essential basic input/output system storage to store a basic input/output system command for a basic operation of the storage medium and the auxiliary memory; an OS storage to store an essential operating system and a storage function command required to process the storage function; and a controller to control the power supply to supply electric power to the auxiliary memory and to perform the BIOS command in the BIOS storage and the OS and the storage function command in the OS storage, so that the storage function is performed based on the data of the storage medium, according to the storage function processing signal from the selection input part.

17 Claims, 3 Drawing Sheets

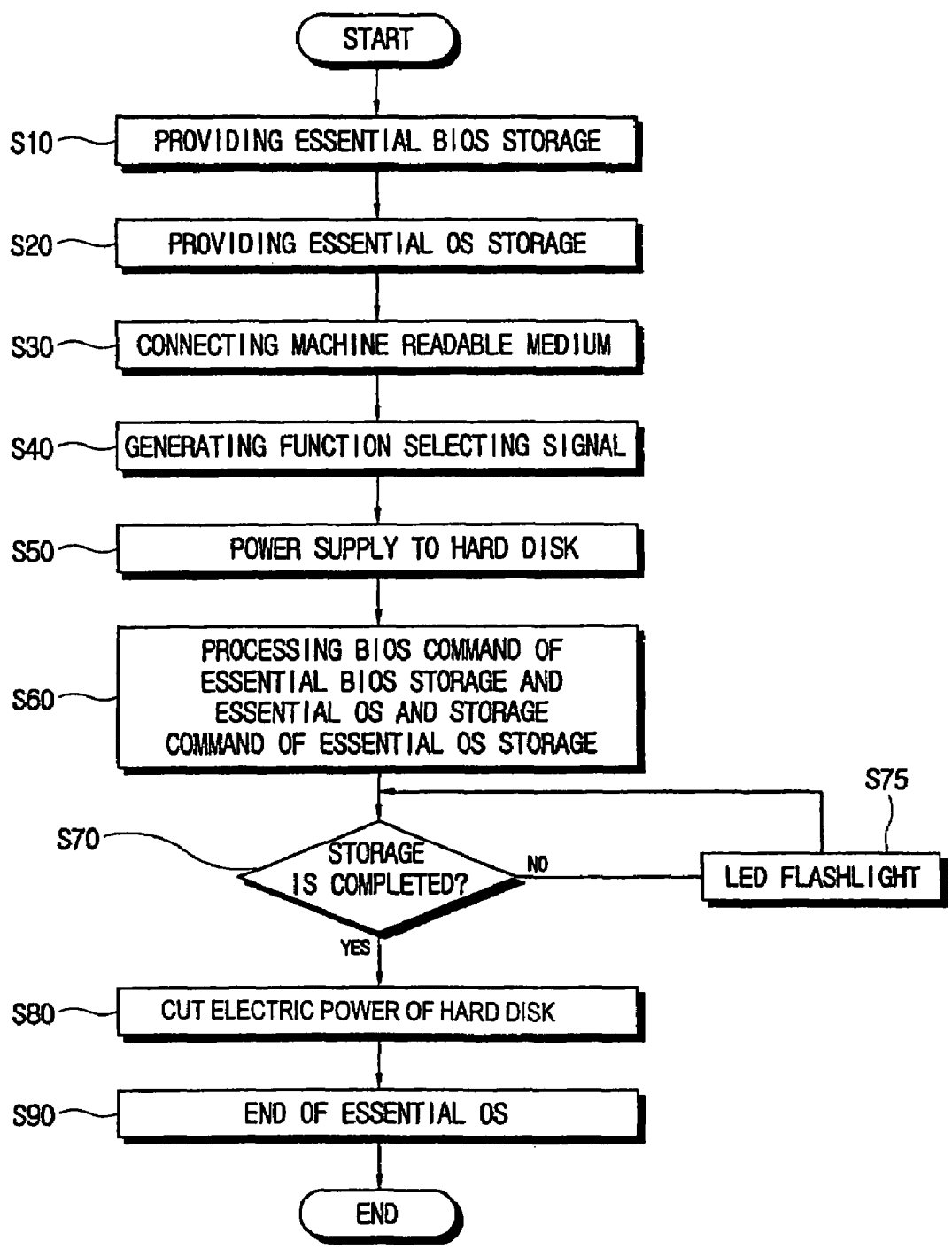

TRANSFERRING DATA WITHOUT COMPLETING A BOOT PROCESS

CROSS-REFERENCE TO RELATED APPLICATION

This application claims the benefit of Korean Patent Application No. 2003-82071, filed on Nov. 19, 2003, in the Korean Intellectual Property Office, the disclosure of which is incorporated herein by reference.

BACKGROUND OF THE INVENTION

1. Field of the Invention

The present invention relates to a computer system having a connector to be connected with a detachable storage medium and a control method thereof, and more particularly, to a computer system which allows data in the storage medium to be quickly stored in an auxiliary memory of the computer system and that utilizes the minimum electric power required to process the storage function to reduce electric power consumption, and a control method thereof.

2. Description of the Related Art

Generally, a computer system is designed so that data is input through an input device and data is processed and operated by a central processing unit (CPU) to output a result there from.

To perform a task using the computer system, an operating system installed to the computer system should normally be booted and a normal mode should be maintained.

Generally, a user pushes a power button provided to the computer system to generate a computer operating signal, then a power management controller to which the computer operating signal is transferred controls a power supply to supply electric power to the CPU, a hard disk, a graphic card, a monitor, and other peripheral units connected with the computer system.

After electric power is supplied according to the computer operating signal, a basic input/output system (BIOS) examines whether states of the CPU, the graphic card, and the memory correspond to data of a complementary metal oxide semiconductor (CMOS) and that peripheral units, such as a hard disk, a printer, a local area network (LAN) card and a small computer system interface (SCSI), are connected.

When there are no hardware problems, the BIOS sequentially reads and stores boot files, such as io.sys, msdos.sys, config.sys, command.com and autoexec.bat, which are normally stored in the hard disk, i.e. the c:/drive, to the memory, and sequentially processes commands recorded in the files. After this time, an operating system (OS) controls the boot process of the computer system.

For example, in an OS of a Window family, when the files are stored in the memory, files such as win.com, win.ini, and system.ini are registered to the memory and commands recorded in a registry are sequentially processed and the OS is started. Then, a desktop is displayed according to a resolution, color tone, background screen, etc., selected by a user and a self-starting program is processed, thereby completing the OS booting process.

Thereafter, the computer system is in a normal mode in which a task is done by inputting a request from the user.

Accordingly, to set the normal mode in which a task is done, a BIOS check and an OS booting, which necessitate a long time to complete, are required.

Especially, when a user desires to operate the computer system to only execute a specific task, such as to store data of a storage medium to an auxiliary memory of the computer system, the BIOS check and OS booting require an unnecessarily long time.

Further, electric power is supplied to parts that are not required to execute the specific task, resulting in unnecessary consumption of electric power.

SUMMARY OF THE INVENTION

Accordingly, it is an aspect of the present invention to provide a computer system according to which data of a storage medium is easily and quickly stored to an auxiliary memory of the computer system, and a control method thereof.

The foregoing and/or other aspects of the present invention are achieved by providing a computer system comprising: a power supply; a connector to be connected with a detachable storage medium; an auxiliary memory; a selection input part to generate a storage function processing signal to store data of the storage medium to the auxiliary memory according to an operation of a user; a BIOS storage to store an essential BIOS command for a basic operation of the storage medium and the auxiliary memory; a OS storage to store an essential OS and a storage function command required to process the storage function; and a controller to control the power supply to supply electric power to the auxiliary memory and to perform the BIOS command in the BIOS storage and the OS and the storage function command in the OS storage, so that the storage function is performed based on the data of the storage medium, according to the storage function processing signal from the selection input part.

Additional aspects and/or advantages of the invention will be set forth in part in the description which follows and, in part, will be obvious from the description, or may be learned by practice of the invention.

According to an aspect of the invention, the OS storage comprises: a command to generate a storage completing signal when the data of the storage medium is completely stored to the auxiliary memory, where the controller controls the power supply to cut electric power based on the storage completing signal.

According to an aspect of the invention, the computer system further comprises: a light emitting diode (LED) to indicate that the data of the storage medium is being stored to the auxiliary memory, where the controller controls the power supply to supply electric power to the LED based on the storage function processing signal from the selection input part, and the OS storage includes a command to control the LED to emit a flashlight while the storage command is being processed.

According to an aspect of the invention, the computer system further comprises: a condition setting input part to selectively input a directory of the auxiliary memory to store the data of the storage medium and/or a storage form whether the data of the storage medium is deleted or saved after completing the storage.

The foregoing and/or other aspects of the present invention are also achieved by providing a computer system comprising: a connector to be connected with a storage medium having predetermined data; and an auxiliary memory, where the computer system stores data of the storage medium to the auxiliary memory without a whole booting process when sensed that the storage medium is connected with the connector.

According to an aspect of the present invention, the computer system further comprises: a selection input part to generate a storage function processing signal to store data of the storage medium to the auxiliary memory according to an operation of a user, where when a user operates the selection input part to generate the storage function processing signal, the computer system stores data of the storage medium to the auxiliary memory without a whole booting process.

According to an aspect of the present invention, the storage medium is a memory stick, a flash memory, a camcorder, a digital camera, an MP3 player, or a cellular phone.

According to an aspect of the present invention, the computer system further comprises: a BIOS storage to store an essential BIOS command for a basic operation of the storage medium and the auxiliary memory; a OS storage to store an essential OS and storage function commands required to process the storage function; and a controller to perform the BIOS command in the BIOS storage and the OS and the storage function command in the OS storage so that the storage function is performed based on the data of the storage medium when sensed that the storage medium is connected with the connector.

The foregoing and/or other aspects of the present invention are also achieved by providing a control method of a computer system having a power supply and a connector to be connected with a detachable storage medium. The control method comprises: providing a BIOS storage to store an essential BIOS command for a basic operation of the storage medium and an auxiliary memory; providing an OS storage to store an essential OS and a storage function command required to process a storage function to store data of the storage medium into the auxiliary memory; connecting the storage medium to the computer system; generating a storage function processing signal to process the storage function according to an operation of a user; supplying electric power to the auxiliary memory based on the storage function processing signal; and processing the BIOS command of the BIOS storage and the OS and the storage function command of the OS storage based on the storage function processing signal.

According to an aspect of the present invention, the control method of the computer system further comprises: selectively inputting a directory of the auxiliary memory to store the data of the storage medium and/or a storage form whether the data of the storage medium is deleted or saved after completing the storage.

According to an aspect of the present invention, the control method of the computer system further comprises: controlling the power supply-to-supply electric power to an LED to emit a flashlight while the storage is being processed.

According to an aspect of the present invention, the control method of the computer system further comprises: cutting electric power of the auxiliary memory after completing the storage function.

BRIEF DESCRIPTION OF THE DRAWINGS

The above and/or other aspects and advantages of the present invention will become apparent and more readily appreciated from the following description of the embodiments, taken in conjunction with the accompanying drawings of which:

FIG. 3 is a control flow chart of the computer system shown in FIG. 1.

DETAILED DESCRIPTION OF THE PREFERRED EMBODIMENTS

Figure 1:
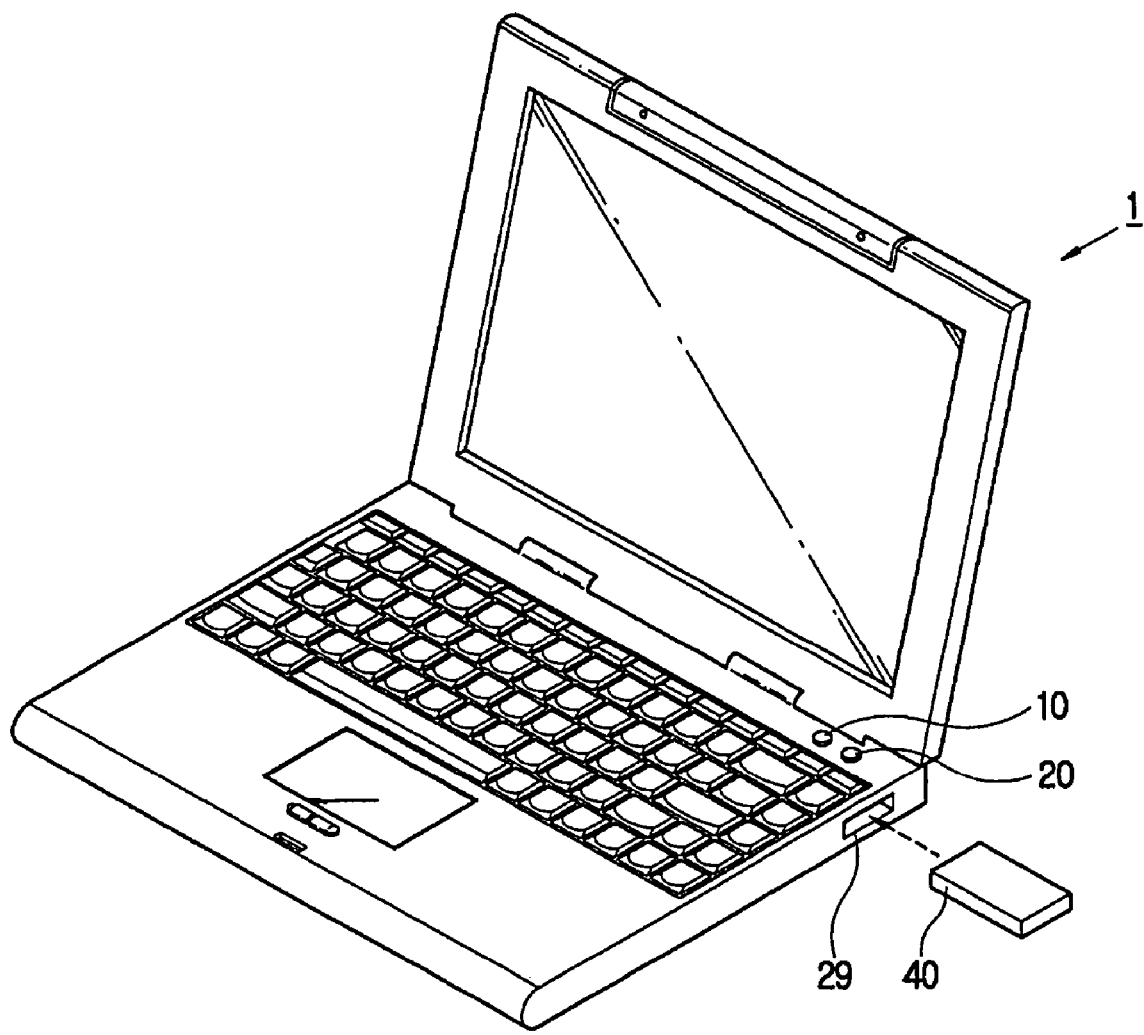
FIG. 1 is a perspective view of a computer system according to an aspect of the present invention.

Reference will now be made in detail to the embodiments of the present invention, examples of which are illustrated in the accompanying drawings, wherein like reference numerals refer to like elements throughout.

As shown in FIG. 1, a computer system 1 according to an aspect of the present invention comprises a monitor, input/output devices such as a keyboard, a touch pad and the like. Further, the computer system 1 comprises: a main body casing having a hard disk (not shown) to store an operating system (OS), a variety of application programs and information files, a read only memory (ROM) to store a basic input/output system (BIOS), a central processing unit (CPU) to process an operation and to control the computer system, a memory to store a present operation status, a main board installed with a chip set to perform graphic work or other tasks, and peripheral units.

The computer system according to an aspect of the present invention further comprises: a power button 10 to generate a computer operating signal when a user pushes the power button 10, a selection input part 20 to generate a storage function processing signal by which a storage function is processed according to an input of the user, and a connector 29 is provided to the main body of the computer system 1 to connect a detachable storage medium 40.

In FIG. 1, the computer system 1 is drawn as a portable computer but the present invention is not limited thereto. The computer system according to the present invention can be implemented to all computer systems including a desktop computer, a plasma display panel (PDP), etc., by allowing connection with and exchange data with the storage medium 40.

The power button 10 is an input button provided to the main body of the computer system to generate a computer operating signal according to which electric power is supplied to the computer system, including the CPU, and a normal mode is started after completing a normal BIOS check and an OS booting.

The connector 29 is a connecting terminal with which the storage medium 40 is connected to transfer data from storage medium 40 to the computer system and may include a variety of forms of connectors such as a serial port, a universal serial bus (USB) port, or an International Electrical & Electronics Engineering (IEEE) 1394 port, and the like.

The storage medium 40 is used to exchange data with the computer system 1. According to an aspect of the present invention, external devices including a portable auxiliary memory, such as a memory stick and a flash memory, a camcorder, a digital player, an MP3 player, a cellular phone, etc. can be applied as the connector 29 of the computer system as far as the storage medium 40 comprises a predetermined memory to which data is stored.

Figure 2:
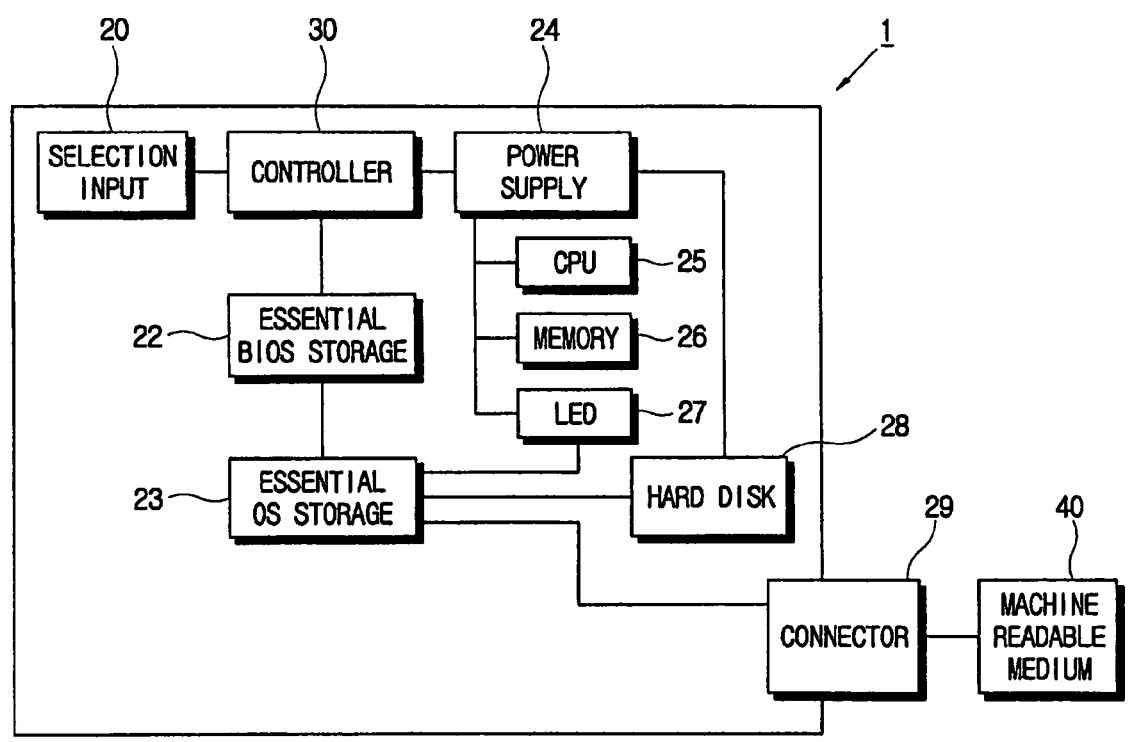
FIG. 2 is a control block diagram of the computer system shown in FIG. 1.

The computer system 1 according to an aspect of the present invention is to store data stored into the storage medium 40 to the hard disk of the computer system 1 with speed and simplicity. As shown in FIG. 2, the computer system comprises: a power supply 24, the connector 29 to connect the detachable storage medium 40, a hard disk 28, the selection input part 20 to generate a storage function processing signal by which a storage function is processed according to an input of the user, a BIOS storage 22 to store an essential BIOS command for a basic operation of the storage medium 40 and the hard disk 28, a OS storage 23 to store an essential OS and a storage command required to process the storage function, and a controller 30 to control the power supply 24 to supply electric power to the hard disk 28 based on the storage function processing signal and the BIOS storage 22 to process the BIOS command, and the OS storage 23 to process the OS and the storage command.

The computer system 1 further comprises: a light emitting diode (LED) 27 to indicate that data of the storage medium 40 is being stored to the hard disk 28.

According to an aspect of the present invention, an LED to indicate that the hard disk 28 is being used is provided as the LED 27 of the present invention.

The selection input part 20 generates the storage function processing signal by which a storage function is processed according to an operation of a user.

According to an aspect of the present invention, the selection input part 20 is a switch that outputs a signal in a high (low) state without an operation of the user and outputs a signal in a low (high) state according to an operation of the user.

Further, according to another aspect of the present invention, the selection input part 20 is a switch provided to a position at which a connection of the connector 29 is recognized, so that the selection input part 20 is turned on and generates the storage function processing signal when a user connects, for example, a connecting terminal such as a jack of the storage medium 40 with the connector 20. That is, the selection input part 20 is a switch that is provided to the connector 29 to generate a signal in a high state when the storage medium 40 is not connected and generates a signal in a low state when the storage medium 40 is physically connected with the connector 20 according to an installation of the storage medium 40 as one of indirect operations to process the storage function.

The BIOS storage 22 stores a BIOS command to operate the storage medium 40 and the hard disk 28.

Accordingly, to store data of the storage medium 40 to the hard disk 28, for example, the monitor is not required to display the data. Thus, it is not required to examine whether a state of a graphic card corresponds to information stored in a complementary metal oxide semiconductor (CMOS) and further, whether peripheral units such as a printer, a local area network (LAN) card, a small computer system interface (SCSI) and the like are connected.

That is, in this case, it is only required to examine whether states of the CPU 25 and the memory 26 correspond to data stored in the CMOS and whether the storage medium 40, and the hard disk 28 are connected.

Accordingly, the BIOS storage 22 needs to store the BIOS command required for a basic operation of peripheral units that allow the storage medium 40 and the storage function to work and doesn't require unnecessary BIOS commands.

According to an aspect of the present invention, the BIOS storage 22 is provided as a single body with a normal ROM to store BIOS to operate a computer using the power button 10 or stored in a ROM aside from the normal ROM.

The OS storage 23 stores essential OS and a storage command required to process the storage function.

That is, the BIOS stored in the BIOS storage 22 sequentially reads and stores boot files, such as io.sys, msdos.sys, command.sys, to a memory, which are edited to process only necessary parts according to a selection of a user. Then, the BIOS stored in the BIOS storage 22 sequentially processes commands recorded in the above files. Thereafter, when an OS of a Window family is used, files such as win.com, win.ini, system ini and the like, are registered to the memory after the above files are stored in the memory. Next, commands recorded in the registry are sequentially processed and the OS is started, thereby completing an OS booting.

At this time, if the storage doesn't require to display a picture on the monitor of the computer system 1, it is not required that a desktop is displayed based on a resolution, a color tone or a background screen or a self-starting program is processed.

Essentially, to store the data of the storage medium 40 to the hard disk 28, only commands for an OS of a disk operating system (DOS) family, for example, the mini-DOS, may be processed without processing commands for the OS of the Window family.

When the essential OS booting is completed, the commands to store the data of the storage medium 40 to the hard disk 28 is processed, thereby allowing quick and easy storage of data.

According to an aspect of the present invention, the OS storage 23 is stored in a ROM separately provided or in the hard disk 28.

The controller 30 controls the power supply 24 to supply electric power to the hard disk 28 based on the storage function processing signal and to the BIOS storage 22 to process the BIOS command, the OS storage 23 to process the OS, and the storage command.

When a user pushes the power button 10, a computer operating signal is generated and a power managing controller controls to supply electric power to the entire computer system. In contrast thereto, when the storage function processing signal is input to the controller 30 by the selection input part 20, the controller 30 controls the power supply 24 to supply electric power not only to the CPU 25 for basic computer operations, but also to the hard disk 28 to store the data of the storage medium 40.

The BIOS command stored in the BIOS storage 22 is processed based on the storage function processing signal. Then, as described above, it is examined whether states of the CPU 25 and the memory 26 correspond to data stored in the CMOS and whether the storage medium 40 having data to be stored and the hard disk 28 to store the data are connected.

The BIOS stored in the BIOS storage 22 sequentially reads and stores boot files, such as io.sys, msdos.sys, command.sys into a memory, which are edited to process only necessary parts according to a selection of a user. Then, the BIOS stored in the BIOS storage 22 sequentially processes commands recorded in the above files. Thereafter, if an OS of a Window family is used, files such as win.com, win.ini, system ini and the like are registered in the memory, after the above files are stored in the memory. Next, commands recorded in the registry are sequentially processed and the OS is started, thereby completing an OS booting.

Thereafter, the storage command is processed. Next, a command to stop the flashlight of the LED is processed or a command to generate a storage completing signal is processed so that the OS stops running and the controller 30 controls the power supply to cut electric power 24 of the hard disk 28.

According to an aspect of the present invention, a directory of the hard disk 28 to store the data of the storage medium 40 is previously set and stored, and it may also be previously set and stored in a storage form to indicate whether the data of the storage medium 40 is deleted or saved, after completing the storage, that is, the data of the storage medium 40 is stored according to the "cut and paste" way or the "copy and paste" way. Alternatively, they may be selectively input through a condition setting input part such as an essential BIOS set or an application provided by a required/normal OS.

Referring to FIG. 3, a description of a control of the computer system according to an aspect of the present invention is shown.

For convenience of the description, the storage function processing signal is assumed to be a signal to which a function to store data of the storage medium 40 in the hard disk 28 is processed.

As shown in FIG. 3, first, the BIOS storage 22 and the OS storage 23 having structures described above are provided at operations S10 and S20. In FIG. 3, the operations S10 and S20 are drawn as separate and sequential operations, but the two operations are processed at the same time or in the reversed sequence.

According to an aspect of the invention, the control method further comprises: selectively inputting a directory of the auxiliary memory to store the data of the storage medium and/or a storage form to indicate whether the data of the storage medium is deleted or saved after completing the storage, that is, the data of the storage medium 40 is stored according to the "cut and paste" way or the "copy and paste" way or may be previously set and stored.

Then, a user connects the storage medium 40 to the connector 20 provided to the computer system 1 at operation S30, and operates the selection input part 20 to generate the storage function processing signal at operation S40.

The controller 30 controls the power supply 24 to supply electric power to the hard disk 28 based on the storage function processing signal at operation S50. Further, the controller 30 controls the BIOS storage 22 to process the BIOS command, the OS storage 23 to process the OS, and the storage command at operation S60.

While the controller 30 controls the OS storage 23 to process the OS and the storage command and to store the data of the storage medium 40 to the hard disk 20 at operation S70, the LED 27 emits flashlight to display the user that the storage is being processed at operation S75. After completing the storage, the controller 30 controls the power supply 24 to cut electric power of the hard disk 28 by processing the command to generate the storage completing signal at operation S80 and ends the OS at operation S90.

Then, when the user detaches the storage medium 40 from the connector to be connected with the computer system 1, all processes are completed.

As described above, with a configuration described above, if a user operates only the selection button specially provided for the storage function, the storage function is processed. In addition thereto, only commands for the BIOS and the OS for the storage are processed, thereby allowing the process of the storage function with ease and speed.

Further, electric power is supplied only to the parts to process the storage function, thereby saving power consumption.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A computer system, comprising:
   a power supply;
   a connector to be connected with a detachable storage medium;
   an auxiliary memory;
   a selection input part to generate a storage function processing signal to store data of the storage medium to the auxiliary memory according to an input from a user;
   a basic input/output system storage to store an essential basic input/output system command for a basic operation of the storage medium and the auxiliary memory;
   an operating system storage to store an essential operating system and a storage function command required to process the storage function; and
   a controller to control the power supply to supply electric power to the auxiliary memory and to perform the basic input/output system command in the basic input/output system storage and the operating system and the storage function command in the operating system storage, so that the storage function is performed based on the data of the storage medium, according to the storage function processing signal from the selection input part.

2. The computer system according to claim 1, wherein the operating system storage comprises:
   a command to generate a storage completing signal when the data of the storage medium is completely stored to the auxiliary memory, wherein the controller controls the power supply to cut electric power based on the storage completing signal.

3. The computer system according to claim 2, further comprising:
   a light emitting diode to indicate that the data of the storage medium is being stored in the auxiliary memory, wherein the controller controls the power supply to supply electric power to the light emitting diode based on the storage function processing signal from the selection input part, and
   the operating system storage includes a command to control the light emitting diode to emit flashlight, while the storage command is being processed.

4. The computer system according to claim 1, further comprising:
   a condition setting input part to selectively input a directory of the auxiliary memory to store the data of the storage medium and/or a storage form to indicate whether the data of the storage medium is deleted or saved after completing the storage.

5. A control method of a computer system having a power supply and a connector to be connected with a detachable storage medium, the method comprising:
   storing an essential basic input/output system command for a basic operation of the storage medium and an auxiliary memory;
   storing an essential operating system and a storage function command required to process a storage function to store data of the storage medium into the auxiliary memory;
   connecting the storage medium to the computer system;
   generating a storage function processing signal to process the storage function according to an input of a user;
   supplying electric power to the auxiliary memory based on the storage function processing signal; and
   processing the basic input/output system command of the basic input/output system storage and the operating system and the storage function command of the operating system storage based on the storage function processing signal.

6. The control method of the computer system according to claim 5, further comprising:
   selectively inputting a directory of the auxiliary memory to store the data of the storage medium and/or a storage form to indicate whether the data of the storage medium is deleted or saved after completing the storage.

7. The control method of the computer system according to claim 5, further controlling the power supply to supply electric power to an light emitting diode to emit a flashlight while the storage is being processed.

8. The control method of the computer system according to claim 5, further comprising:
cutting electric power of the auxiliary memory after completing the storage function.

9. A computer system, comprising:
a connector to be connected with a storage medium having predetermined data;
an auxiliary memory;
a basic input/output system storage to store an essential basic input/output system command for a basic operation of the storage medium and the auxiliary memory;
an operating system storage to store an essential portion of an operating system and a storage function commands required to process the storage function; and
a controller to perform the basic input/output system command in the basic input/output system storage and the operating system and the storage function command in the operating system storage so that the storage function is performed based on the data of the storage medium when sensed that the storage medium is connected with the connector,
wherein the computer system stores data of the storage medium to the auxiliary memory without running an entire booting process, when sensed that the storage medium is connected with the connector.

10. The computer system according to claim 9, further comprising:
a selection input part to generate a storage function processing signal to store data of the storage medium to the auxiliary memory according to an operation of a user, wherein, when the user operates the selection input part to generate the storage function processing signal, the computer system stores data of the storage medium to the auxiliary memory without the entire booting process.

11. The computer system according to claim 9, wherein the storage medium is a memory stick, a flash memory, a camcorder, a digital camera, an MP3 player, or a cellular phone.

12. The computer system according to claim 1, wherein the selection input part is a switch provided to allow the selection input part to be turned on and to generate the storage function processing signal when the user connects the storage medium with the connector.

13. The computer system according to claim 1, wherein the basic input/output system storage also stores an essential command for a basic operation of a hard disk provided to the computer system.

14. The computer system according to claim 1, further comprising:
a read only memory to store the basic input/output system.

15. The computer system according to claim 1, wherein the operating system storage is provided separately from a read only memory of the computer system.

16. The computer system according to claim 1, wherein the essential basic input/output system command is limited to operate the detachable storage medium and a hard disk provided to the computer system.

17. The computer system according to claim 1, wherein the power supply only supplies electric power to a hard disk of the computer system during the storage function.

* * * * *